UNITED STATES PATENT OFFICE.

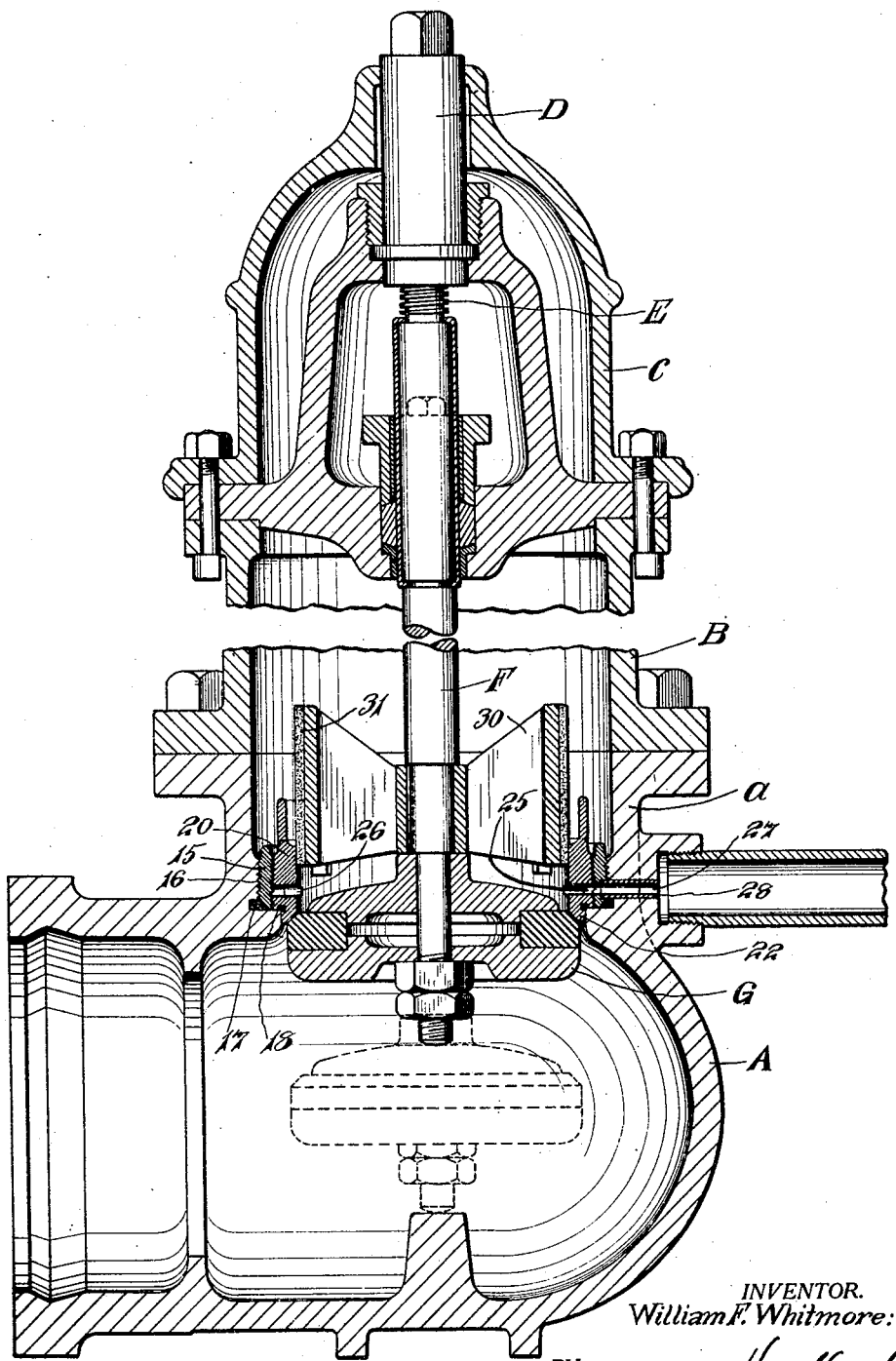

WILLIAM F. WHITMORE, OF WEST HARTFORD, CONNECTICUT.

WATER-HYDRANT.

1,340,352.  Specification of Letters Patent.  Patented May 18, 1920.

Application filed July 28, 1917. Serial No. 183,207.

*To all whom it may concern:*

Be it known that I, WILLIAM F. WHITMORE, a citizen of the United States, and a resident of West Hartford, in the county of Hartford and State of Connecticut, have invented certain new and useful Improvements in Water-Hydrants, of which the following is a specification.

This invention relates especially to water hydrants of the compression type and is designed to improve the main valve construction and, in conjunction therewith, to provide a non-corroding drip valve.

The drawing is a side elevation partly in section illustrating the invention.

In the drawings, A denotes the hydrant base with a flanged neck $a$ to receive the stand pipe B; C is the head positioned at the upper end of the stand pipe and in which is mounted an operating mechanism such as the nut D, by means of which the screw E is actuated to move the stem F at the lower end of which is carried the main valve G. The parts of the hydrant shell, including the base, are usually made of cast iron.

In accordance with my invention I provide an annular flange in the upper part of the base which may conveniently be formed integrally with the base and projects inwardly somewhat from the walls of the neck. Fitted within the neck is a supporting ring 15, preferably provided with means, such as the screw threads 16, for seating it firmly on the face of the flange to form a water tight joint. This ring when once seated is preferably secured in position as by a key. Fitting within this and preferably engaged therewith by screw threads is a removable valve seat ring 20, which can be forced down to a firm seat on the flange to provide a water tight joint. If desired gaskets 17, 18, may be utilized between the supporting and valve seat rings and the flange to form, or assist in forming, the water tight joints, but it is preferable both of the rings shall at least in part be seated directly on the flange in order to form a water-tight metal to metal joint. A depending lip 22, at the bottom of this ring, overhangs the edge of the flange and provides a seat for the main valve G. The upper edge of this ring is notched to receive a suitable wrench.

There is thus provided a very simple, easily manufactured and inexpensive type of valve seat which provides reliable water tight joints and which may be readily removed for renewal or repair.

Preferably both the supporting ring and the valve seat ring are formed of non-corroding material such as bronze, in order to insure that the valve seat ring will not become rusted in place, but may always be removed for replacement or repairs. A drip chamber 25, is formed as here shown by cutting a circumferential groove in the exterior of the valve seat ring 20, the outer wall of the drip chamber being formed by the supporting ring 15. Communicating ports 26, connect the interior of the valve with the drip chamber, and it is provided with an outlet 27, which may be seated into the supporting ring sufficiently low to act as a key to prevent its rotation relative to the base. There is thus provided a drip chamber, which is either lined with, or surrounded by, non-corroding material. Means are provided for closing the communicating ports when the main valve is open, such means comprising arms 30 fast on the valve stem and having leather faced ends 31 fitting against the inner ends of the ports. Obviously the drip chamber may be formed entirely in either of the rings or partly in both rings.

In accordance with the provision of the statutes there has been described the principle of operation of my invention together with the apparatus which is now considered to represent the best embodiment thereof, but I desire to have it understood that the apparatus shown is only illustrative and that the invention can be carried out by other means.

I claim as my invention:—

1. In a hydrant, the combination with a base, of a removable valve seat ring of non-corroding material, a supporting ring of non-corroding material in which said valve seat ring is directly mounted, an inwardly projecting annular flange on said base on which both of said rings are seated to produce a water tight joint, a drip chamber formed by said rings and wholly inclosed in non-corroding material, a communicating port between said chamber and the interior of said hydrant, a valve therefor, and an outlet from said chamber.

2. In a hydrant, the combination with a base, of a removable valve seat, a supporting ring in which said valve seat is directly mounted, an inwardly projecting flange on said base on which said rings are seated to produce a water tight joint, a drip chamber formed by said rings, a communicating port between said chamber and the interior of the hydrant, a valve therefor, an outlet from said chamber, and a lining for said outlet extending into said supporting ring to lock it to the base.

3. In a hydrant the combination with a base, stand-pipe, head, main valve, and operating mechanism therefor, of an inwardly projecting annular flange in the upper part of said base, a supporting ring of non-corroding material threaded into said base and seated upon said flange, a valve seat ring of non-corroding material threaded into said supporting ring and seated on said flange to form a water tight joint, a seat formed on said ring for said main valve, a drip chamber formed at least in part in one of said rings and entirely inclosed by the non-corroding material, a communicating port between said chamber and the interior of said hydrant, a valve therefor, and an outlet from said chamber.

4. In a hydrant the combination with a base, stand-pipe, head, main valve, and operating mechanism therefor, of an inwardly projecting annular flange in the upper part of said base, a supporting ring of non-corroding material threaded into said base and seated on said flange, a valve seat ring of non-corroding material threaded into said supporting ring and seated on said flange to form a water tight joint, a seat on said ring for said main valve, an annular recess in the outer surface of said valve seat ring forming in conjunction with said supporting ring a drip chamber, a communicating port between said chamber and the interior of the hydrant, a valve therefor, an outlet from said chamber through said supporting ring, and a lining of non-corroding material for said outlet extending into said supporting ring to lock it to said base.

5. A hydrant comprising a base formed with an inwardly projecting annular supporting flange, a supporting ring having threaded engagement with said base above said flange, a retainer extending through said base and into said supporting ring to lock same in position, a valve seat ring having threaded engagement with said supporting ring and seated upon said flange to form a water tight joint, a valve seat formed at the bottom of said ring, a drip chamber formed in part by said ring above the flange, a communicating port between said chamber and the interior of the hydrant, an outlet from said chamber, a lining of non-corroding material for said chamber, a valve stem and operating mechanism therefor, a main valve at the lower end of said stem coöperating with said main valve seat, and a drip valve secured to said stem and coöperating with said communicating port.

6. A hydrant comprising a base formed with an inwardly projecting annular supporting flange, a supporting ring having threaded engagement with said base above said flange, a valve seat ring having threaded engagement with said supporting ring and seated upon said flange to form a water tight joint, a valve seat formed at the bottom of said ring, a drip chamber formed in part by said ring above the flange, a communicating port between said chamber and the interior of the hydrant, an outlet from said chamber comprising a retainer drip tube extending into said base and said supporting ring to lock the latter in place, a lining of non-corroding material for said chamber, a valve stem and operating mechanism therefor, a main valve at the lower end of said stem coöperating with said main valve seat, and a drip valve secured to said stem and coöperating with said communicating port.

WILLIAM F. WHITMORE.